United States Patent [19]
Kneisley et al.

[11] Patent Number: 5,864,117
[45] Date of Patent: Jan. 26, 1999

[54] ARC WELDER WITH AUTOMATIC SENSING OF REMOTE CURRENT CONTROL DEVICE

[75] Inventors: Joel D. Kneisley, Painesville; Trang D. Nguyen, Mentor, both of Ohio

[73] Assignee: The Lincoln Electric Company, Cleveland, Ohio

[21] Appl. No.: 106,513

[22] Filed: Jun. 29, 1998

Related U.S. Application Data

[63] Continuation of Ser. No. 792,040, Jan. 31, 1997, Pat. No. 5,777,295.

[51] Int. Cl.[6] ........................................................ B23K 9/10
[52] U.S. Cl. ................................................................ 219/132
[58] Field of Search ................................... 219/132, 130.5

[56] References Cited

U.S. PATENT DOCUMENTS

| | | | |
|---|---|---|---|
| 2,872,566 | 2/1959 | Leppala | 219/132 |
| 3,278,835 | 10/1966 | Hart | 219/132 |
| 4,216,367 | 8/1980 | Risberg | 219/132 |
| 5,777,295 | 7/1998 | Kneisley et al. | 219/132 |

*Primary Examiner*—Clifford C. Shaw
*Attorney, Agent, or Firm*—Vickers, Daniels & Young

[57] ABSTRACT

Welding apparatus having selectively operable local and remote current setting devices for selecting and controlling the welding current to be applied across an electrode and workpiece at a welding arc includes a control circuit for sensing the connection and disconnection of the remote current setting device thereto and respectively setting a remote and local mode of welding current control.

31 Claims, 3 Drawing Sheets

ARC WELDER WITH AUTOMATIC SENSING OF REMOTE CURRENT CONTROL DEVICE

This patent application is a continuation of application Ser. No. 792,040, now U.S. Pat. No. 5,777,295 filed on Jan. 31, 1997, and incorporated herein by reference.

BACKGROUND OF THE INVENTION

The present invention relates to the art of arc welding and, more particularly, to welding apparatus having both local and remote control capabilities with respect to adjusting the welding current.

The present invention finds particular utility in connection with TIG welding apparatus and, accordingly, will be illustrated and described in connection with such apparatus. At the same time, as will become apparent hereinafter, the invention is applicable to welding apparatus other than that for TIG welding and wherein it is desired to provide welding current adjustment capability both at the apparatus and at a welding station or site which is remote therefrom.

TIG welding apparatus has been provided heretofore with selectively operable local and remote welding current selecting arrangements each in the form of a potentiometer for outputting a corresponding control signal by which the welding apparatus power supply is adjusted to output a selected welding current. The local potentiometer is adjustable through a control knob on the power supply, and the remote potentiometer is adjustable through a hand or foot operated device at the remote location and is connected to the power supply through a control cable therebetween.

Such prior welding apparatus includes a switch on the power supply having local and remote modes which provide for selecting between local and remote control of the welding current. When the switch is in the local mode, the welding current is determined by the setting of the knob on the power supply. When the switch is in the remote mode, the welding current is determined by the setting of the remote potentiometer. When the switch is in the remote mode, the remote potentiometer is operable to output a control signal by which the welding current is adjustable from minimum current up to a maximum current as determined by the setting of the local potentiometer.

When TIG welding thin workpieces, current control is critical. While apparatus of the foregoing character operates satisfactorily with respect to welding thin workpieces when the operator positions the switch in the remote position, and properly modulates the remote control, operators may forget to change the switch from the local to the remote mode and then proceed to initiate a welding operation through use of the remote potentiometer with the switch in the local mode. With the foregoing apparatus, as soon as the remote control switch is displaced from the off position, the welding current immediately rises to the current level set by the local potentiometer. Accordingly, if the latter setting provides a higher current level than that needed for welding thin workpieces, the workpieces are burned through and, most often, rendered useless thereby. Moreover, the high current can damage the electrode. Such burn through and/or electrode damage is not only undesirable but also expensive both from the standpoint of lost operator time and from the standpoint of damage workpieces and/or electrode replacement cost.

SUMMARY OF THE INVENTION

In accordance with the present invention, welding apparatus having both local and remote current control capability is provided which advantageously eliminates the foregoing problem.

The control circuit includes an arrangement for sensing when the remote potentiometer or pot. is electrically connected therewith and disconnected therefrom, and the control circuit includes an automatic switching arrangement responsive to the sensed condition for appropriately controlling the connection of the current control signals from the local and remote current setters to the power supply. The switching arrangement provides for connecting the control signal outputted by the local pot. to the remote pot. when the remote control is connected. Accordingly, the remote pot. is operable to output a control signal having a maximum magnitude determined by the magnitude of the control signal from the local pot., thus enabling the remote pot. to control the welding current from minimum to maximum as determined by the setting of the local pot.

Preferably, the remote current setting device is a hand or foot operated potentiometer electrically connected with and disconnected from the control circuit by a plug and socket arrangement. When the remote device is plugged into the control circuit, the sensing portion of the latter causes the control circuit to shift from the local to the remote mode, and when the remote controller is unplugged the sensing circuit causes the control circuit to shift from the remote to the local mode.

It is accordingly an outstanding object of the present invention to provide apparatus of the foregoing character wherein the control circuit senses the connection and disconnection of the remote pot. therewith and to respectively shift between remote and local modes in response to such sensing.

BRIEF DESCRIPTION OF THE DRAWINGS

The foregoing objects, and others, will in part be obvious and in part pointed out more fully hereinafter in conjunction with the written description of a preferred embodiment of the invention illustrated in the accompanying drawings in which.

DESCRIPTION OF A PREFERRED EMBODIMENT

Figure 1:
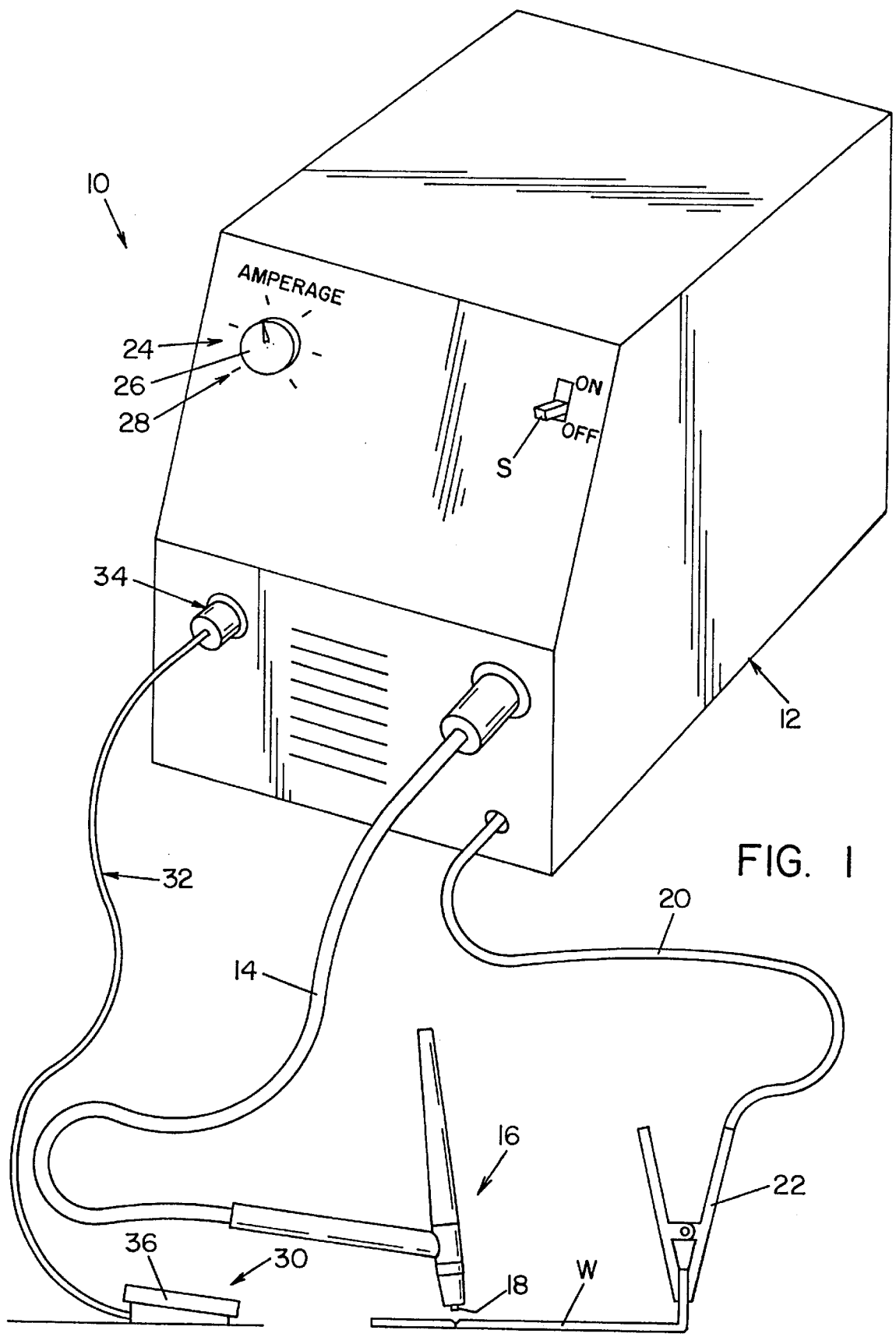
FIG. 1 is a prospective view of welding apparatus in accordance with the present invention.

Referring now in greater detail to the drawings wherein the showings are for the purpose of illustrating a preferred embodiment of the invention only and not for the purpose of limiting the invention, FIG. 1 illustrates a TIG welder 10 comprising a casing or housing 12 which encloses a welding power supply, not shown. As is well known, the power supply includes an output terminal connected through a power cable 14 to a welding gun 16 which includes a nonconsumable electrode 18, and a terminal connected by a ground cable 20 to a workpiece W through a suitable clamp 22. As is also well known, welder 10 is provided with an input power supply line, not shown, by which the welder is adapted to be connected to a suitable input power source. It will be appreciated that the power supply once connected to an input power source is adapted to be turned on and off through the manipulation of control switch S on casing 12. The output terminals of the power supply direct a welding current across a gap between electrode 18 and workpiece W, and the welding current has a magnitude or value which is selectable for controlling the welding current in a manner to perform a desired welding operation on the workpiece. A current setting device is indicated in general in FIG. 1 by the numeral 24 and includes a manually rotatable knob 26 which is accessible for adjustment by a welding operator of the desired welding current. Since current setting device 24 is mounted on welder 10, it is referred to herein as the local current setting device, or local pot.

Welder 10 further includes a remotely located current control device 30 which is adapted to be connected to the welder power supply through a control circuit to be described in detail hereinafter and which, in accordance with the preferred embodiment, is adapted to be selectively connected to and disconnected from the control circuit through a cable 32 and a plug-in type electrical connector 34. In the embodiment illustrated, remote current control device 30 is in the form of a potentiometer located in and manually adjustable through a foot operated treadle 36. Treadle 36 is normally in the upper position shown in FIG. 1 and is pivoted downward against a spring bias for adjusting the position of the potentiometer. While a foot operated treadle is illustrated, the remote control could be hand operated and mounted on the handle of torch 16 for finger or thumb operation by the welding operator.

In operation, as will become apparent hereinafter, when the remote pot, 30 is plugged into the control circuit the latter is shifted to its remote condition of operation and the magnitude of the welding current is controlled by the position of treadle 36 of remote current setting device 30. In the remote condition of the control circuit, a control signal outputted by local current setting device 24 is disconnected from the power supply and is connected to provide the potential across the potentiometer of remotely located device 30, whereby the welding current is adjustable by the remote device from the preselected minimum value therefor up to a maximum value corresponding to that set by knob 26 of local pot. 24. In order to operate welder 10 in the local mode, connector 34 must be unplugged from the control circuit. As will also become apparent hereinafter, such unplugging causes the control circuit to shift from the remote to the local mode of operation thereof whereupon the control signal from local pot. 24 is connected to the power supply for the welding current to have the value set by operating knob 26.

The control circuit by which the welding current is selectively controllable by local pot. 24 or remote pot. 30 includes analog switches 46, 48, 50, and 56. The control circuit further includes a sensing portion 52 which includes a comparator 54 having a first input from voltage source 90 through line 58 and a second input from reference voltage source 60 through line 62. Comparator 54 has an output through line 64 which provides the input for switch 46 through line 66, the input for switch 56 through diode 92 and line 94, and the input for switches 48 and 50 through inverter 68, line 70 and input lines 72 and 74 to switches 48 and 50, respectively. The control circuit further includes a control signal output line 76 through which a voltage signal representative of a selected welding current is transmitted as a current preset signal to the control circuit of the power supply to adjust the output current of the latter either to the current selected through the use of local current setting device 24 or up to the latter current when the current is controlled through remotely located current setting device 30.

Figure 2:
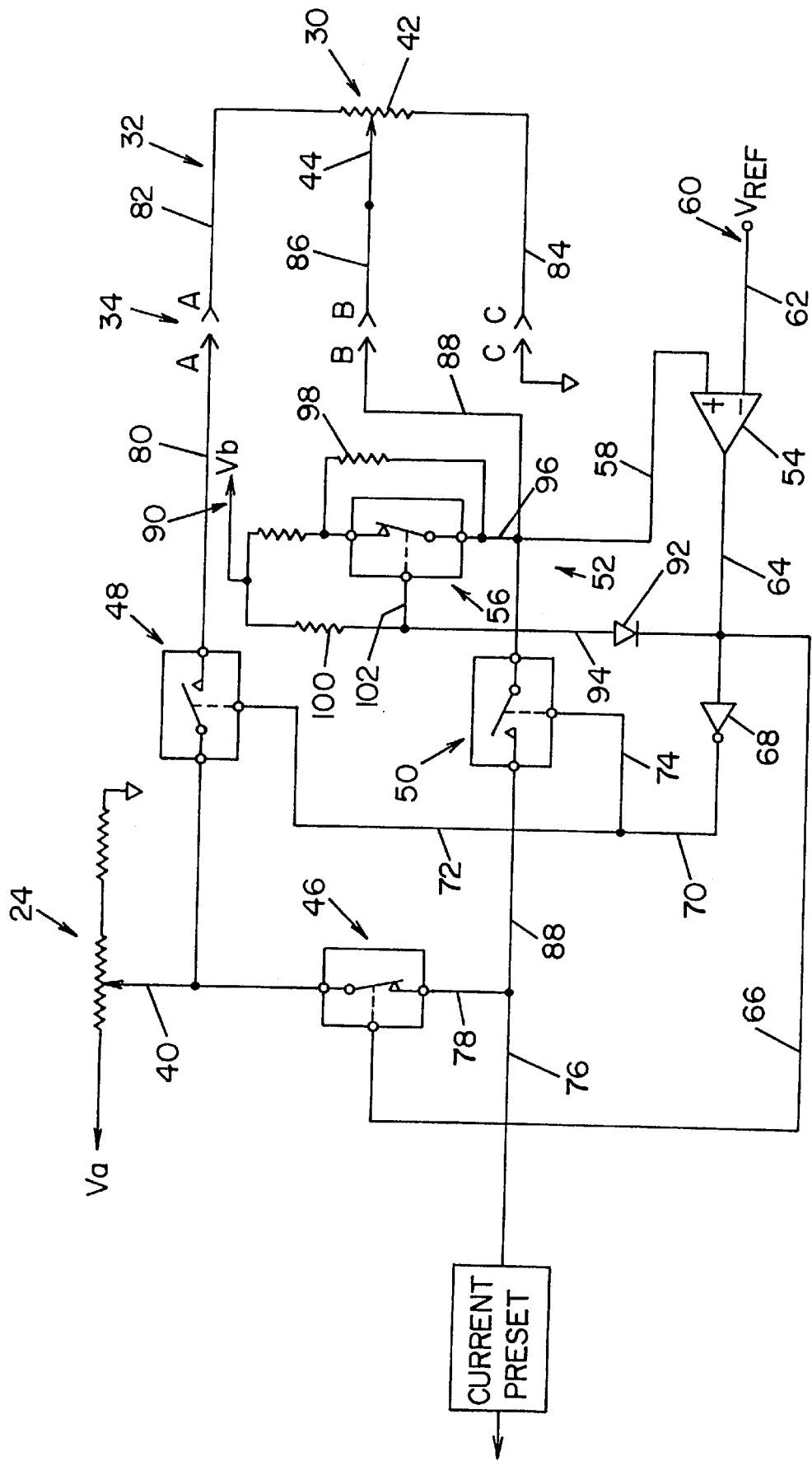
FIG. 2 is a wiring diagram illustrating a preferred embodiment of the control circuit of the present invention and showing the control circuit in the local condition.

With further reference to FIG. 2, the plug-in connector 34 between the control circuit and remote pot. 30 includes mating contacts A—A, B—B and C—C. Switch 48 is in a line 80 between a contact arm 40 of local pot. 24 and contact A of the control circuit, and switch 50 is in line 88 between the juncture of line 78 therewith and contact B of the control circuit. Switch 46 is in line 78 between contact arm 40 and line 88, and contact C of the control circuit is connected to ground. Resistance element 42 of remote current setting device 30 is connected across contacts A and C of the remote device through lines 82 and 84, and contact arm 44 of remote current setting device 30 is connected to contact B of the latter by line 86. Switch 56 is in line 96 between the junctures of lines 58 and 88 and voltage source 90. Resistor 98 is parallelly connected across switch 56. Resistor 100 connects voltage source 90 to input 102 of switch 56.

When remote current setting device 30 is unplugged from the control circuit as shown in FIG. 2 and thus electrically disconnected therefrom, the control circuit is in its local condition of operation in which switch 46 is on or closed and switches 48 and 50 are off or open. More particularly in this respect, reference voltage 60 is selected such that the output of comparator 54 switches high outputting a logic 1 to line 64 and thus line 66 to switch 46 when the control circuit is in the local condition of operation. Switches 46, 48, 50, and 56 open in response to a logic 0 and close in response to a logic 1, whereby the logic 1 ouputted from comparator 54 through line 66 closes switch 46. The logic 1 in line 64 turns diode 92 off whereby a logic 1 is applied through resistor 100 to close switch 56. With switch 56 closed, a sufficient current will guarantee to make connection at mating contacts B—B and C—C when a remote current setting device is plugged in. The logic 1 in line 64 is applied to inverter 68, whereby the output thereof to line 70 is a logic 0 which is applied to switches 48 and 50 through lines 72 and 74 to turn the latter switches off as indicated by the open positions thereof in FIG. 2. Accordingly, when the control circuit is in the local mode, the current control signal from local potentiometer 24 is connected by switch 46 to line 76.

Figure 3:
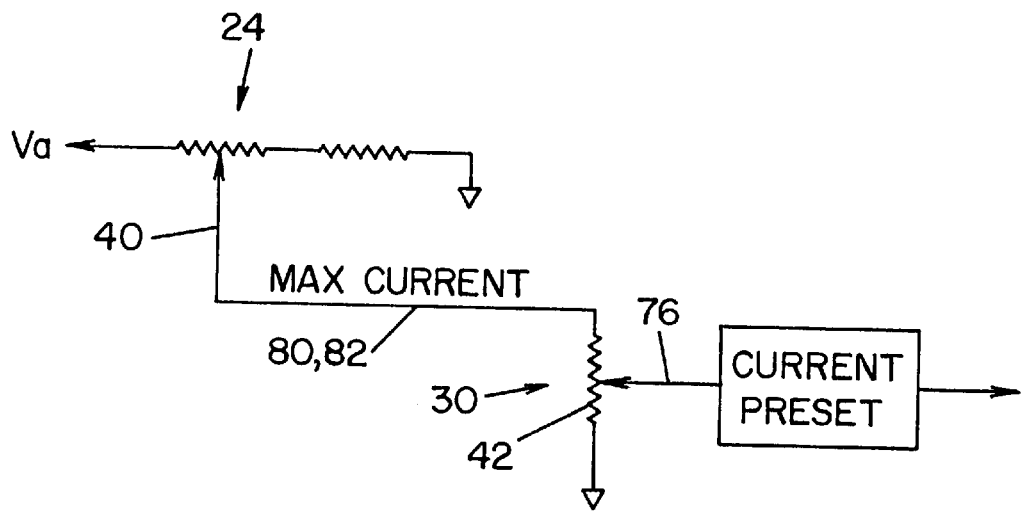
FIG. 3 is a wiring diagram showing a portion of the control circuit in the remote condition.

When remote current setting device 30 is plugged into the control circuit providing electrical continuity between contacts A—A, B—B and C—C, the control circuit sens the presence of the potentiometer of device 30 at contacts B and C. In response to such sensing the output of comparator 54 switches low outputting a logic 0 to line 64 and thus line 66 turning switch 46 off to disconnect the output control signal of local potentiometer 24 from signal output line 76. The logic 0 in line 64 is outputted as a logic 1 to line 70 by inverter 68, and the logic 1 is applied to switches 48 and 50 through lines 72 and 74 to close or turn the latter switches on. The logic 0 in line 64 also turns diode 92 on whereby a logic 0 is applied to turn switch 56 off. With switch 56 open, the resistance of element 98 minimizes the affect of voltage source 90 on control signal output line 76. When switch 46 is off and switches 48 and 50 are on, the control circuit is in the remote mode. As will be appreciated from FIG. 2 and the foregoing description, and as is schematically illustrated in FIG. 3, when the control circuit is in the remote mode the control signal outputted from local pot. 24 is disconnected from control signal output line 76 and is connected across resistance element 42 of remote pot. 30 by switch 48. The control signal outputted through contact arm 44 and line 86 is connected to output line 76 by switch 50 and line 88. Accordingly, it will be appreciated that the maximum voltage of the output control signal from the remote pot. 30, is determined by the setting of local pot. 24. Thus, if control knob 26 of local current setting device is adjustable to provide a range of welding current between, for example, 12 and 175 amps and the control knob is set at 100 amps when the remote current setting device is plugged into the control circuit, 100 amps is the maximum welding current available in response to adjusting the remote control.

Figure 4:
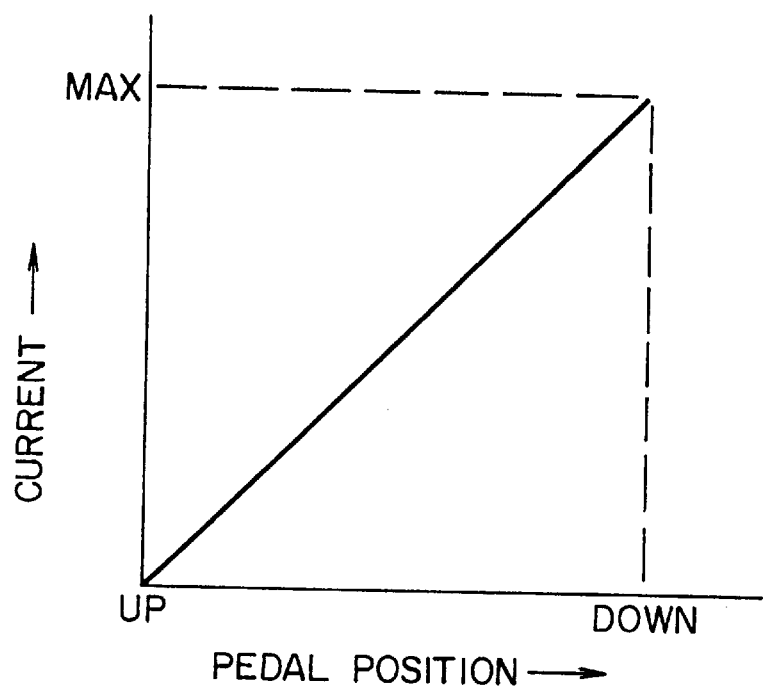
FIG. 4 is a graph schematically illustrating the current controlling characteristics of the remote current selecting device in the remote condition of the control circuit.

As will be appreciated from FIG. 4 and the foregoing description, when the control circuit is in the remote operating condition and treadle 36 of remote selecting device 30 is in the uppermost position thereof designated UP in FIG. 4 the welding current across electrode 18 and workpiece W at the welding station is the minimum welding current which, in the foregoing example, is 12 amps. As treadle 36 is pushed down by the welding operator the welding current progressively increases, and when the treadle is depressed to its lowermost position indicated DOWN in FIG. 4 the welding current is at the maximum value as set by local setting device 24 which, in the foregoing example, would be 100 amps.

While considerable emphasis has been placed herein on a preferred embodiment of the invention, it will be appreciated that other embodiments of the invention can be made and that many changes can be made in the preferred embodiment without departing from the principles of the invention. In this respect, while a foot operated mechanism is disclosed for adjusting the output control signal of the remote current selecting device, a hand operated device could be used and, for example, could be mounted on the handle of the welding torch for finger or thumb operation by the welding operator. These and other changes in the disclosed embodiment as well as other embodiments of the invention will be suggested or obvious from the disclosure herein, whereby it is to be distinctly understood that the foregoing descriptive matter is to be interpreted merely as illustrative of the present invention and not as a limitation.

Having thus described the invention, it is claimed:

1. Arc welding apparatus comprising a power supply for causing a welding current to flow between a workpiece and an electrode, first control means for producing a first control signal having a magnitude representative of a value for said welding current, second control means operable during a welding operation for producing a second control signal having a magnitude representative of a value for said welding current, means for selectively connecting one of said first and second control signals with said power supply, and means responsive to the connecting and disconnecting of said second control signal with said power supply for respectively disconnecting and connecting said first control signal with said power supply.

2. Apparatus according to claim 1, wherein said second control means and said means for selectively connecting including separable electrical contact means.

3. Apparatus according to claim 1, wherein each said first and second control means includes means for adjusting the magnitudes of the corresponding one of said first and second control signals.

4. Apparatus according to claim 1, wherein each said first and second control means includes manually adjustable potentiometer means for adjusting the magnitude of the corresponding one of said first and second control signals.

5. Apparatus according to claim 1, wherein said means for selectively connecting comprises control circuit means including sensing means for sensing said second control means being connected to said control circuit means, said means responsive to the connecting and disconnecting of said second control signal with said power supply including means in said control circuit means responsive to said sensing means.

6. Apparatus according to claim 5, wherein said means responsive to said sensing means includes switch means.

7. Apparatus according to claim 5, wherein said first control signal is connected to said power supply through a first signal line, and switch means responsive to said sensing means for opening said first signal line when said sensing means senses said second control means connected to said control circuit means.

8. Apparatus according to claim 1, wherein said means for selectively connecting comprises control circuit means including sensing means for sensing said second control means being connected to said control circuit means, said means responsive to the connecting and disconnecting of said second control signal with said power supply including first switch means in said control circuit means responsive to said sensing means, second switch means in said control circuit means for disconnecting said first control signal from said power supply in response to said sensing means sensing said second control means being connected to said control circuit means, and third switch means in said control circuit means for connecting said second control signal to said power supply in response to said sensing means sensing said second control means being connected to said control circuit means.

9. Arc welding apparatus comprising a power supply for causing a welding current to flow between a workpiece and an electrode, first current selecting means for producing a first control signal for connection with said power supply for said power supply to cause a first selected welding current to flow between said workpiece and electrode, second current selecting means operable during a welding operation for producing a second control signal for connection with said power supply for said power supply to cause a second welding current to flow between said workpiece and electrode, control circuit means having first and second conditions in which said first control signal is respectively connected to and disconnected from said power supply and in which said second control signal is respectively disconnected from and connected to said power supply, and means including said second current selecting means for shifting said control circuit means between said first and second conditions.

10. Apparatus according to claim 9, and means for selectively electrically connecting and disconnecting said second current selecting means and said control circuit means.

11. Apparatus according to claim 10, wherein one of said second current selecting means and said control circuit means includes plug means and the other includes mating receptacle means, said plug means and receptacle means providing said means for selectively connecting and disconnecting.

12. Apparatus according to claim 10, wherein said control circuit means is in said first condition when said second current selecting means is disconnected from said control circuit means.

13. Apparatus according to claim 12, wherein said control circuit means includes means for sensing said second current selecting means connected to said control circuit means, and means responsive to said sensing for shifting said control circuit means from said first to said second condition.

14. Apparatus according to claim 13, wherein said means responsive to said sensing includes first control signal switch means and second control signal switch means, said first control signal switch means in said second condition disconnecting said first control signal from said power supply, and said second control signal switch means in said second condition connecting said second control signal with said power supply.

15. Apparatus according to claim 13, wherein said means for sensing includes means providing a sensing signal having first and second different magnitudes when said second current selecting means is respectively disconnected from and connected to said control circuit means, means providing a reference signal, and means for comparing said sensing signal and said reference signal and producing first and second shifting control signals respectively when said sensing signal has said first and second magnitudes.

16. Apparatus according to claim 15, wherein said means responsive to said sensing includes control signal switch means having first and second modes respectively providing said first and second conditions of said control circuit means, said control signal switch means being in said first mode in response to said first shifting control signal and in said second mode in response to said second shifting control signal.

17. Apparatus according to claim 16, wherein one of said second current selecting means and said control circuit means includes plug means and the other includes mating receptacle means, said plug means and receptacle means providing said means for selectively connecting and disconnecting.

18. Arc welding apparatus comprising a power supply for applying electrical power to a workpiece and an electrode during a welding operation, first selecting means for producing a first control signal for connection with said power supply to control an electrical variable associated with said welding operation, second selecting means operable during a welding operation for producing a second control signal for connection with said power supply to control said electrical variable, control circuit means having first and second conditions in which said first control signal is respectively connected to and disconnected from said power supply and in which said second control signal is respectively disconnected from and connected to said power supply, and means including said second selecting means for shifting said control circuit means between said first and second conditions.

19. Apparatus according to claim 18, further comprising means for selectively electrically connecting and disconnecting said second selecting means and said control circuit means.

20. Apparatus according to claim 19, wherein one of said second selecting means and said control circuit means includes plug means and the other includes mating receptacle means, said plug means and receptacle means providing said means for selectively connecting and disconnecting.

21. Apparatus according to claim 18, wherein said control circuit means is in said first condition when said second selecting means is disconnected from said control circuit means.

22. Apparatus according to claim 21, wherein said control circuit means includes means for sensing said second selecting means connected to said control circuit means, and means responsive to said sensing for shifting said control circuit means from said first to said second condition.

23. Arc welding apparatus comprising a power supply for applying electrical power to a workpiece during a welding operation, first control means for producing a first control signal having a magnitude representative of a value for an electrical variable associated with said welding operation, second control means operable during a welding operation for producing a second control signal having a magnitude representative of a value for said electrical variable, means for selectively connecting one of said first and second control signals with said power supply, and means responsive to the connecting and disconnecting of said second control signal with said power supply for respectively disconnecting and connecting said first control signal with said power supply.

24. Apparatus according to claim 23, wherein said second control means and said means for selectively connecting including separable electrical contact means.

25. Apparatus according to claim 23, wherein each said first and second control means includes means for adjusting the magnitudes of the corresponding one of said first and second control signals.

26. Apparatus according to claim 23, said second control means comprising an enclosure, a pedal hinged to said enclosure for pivotal movement about a horizontal axis between first and second positions, a potentiometer mounted in said enclosure for rotation in response to pivotal movement of said pedal about said axis, and means responsive to rotation of said potentiometer for varying said magnitude of said second control signal.

27. Apparatus according to claim 23, wherein said means for selectively connecting comprises a control circuit including sensing means for sensing said second control means being connected to said control circuit, and means responsive to the connecting and disconnecting of said second control signal with said power supply including means in said control circuit responsive to said sensing means.

28. A welder comprising a power supply for applying electrical power to a workpiece and an electrode during a welding operation, a local selector for providing a local signal to said power supply representative of a parameter associated with said welding operation; a remote selector connectable to said welder for providing a remote signal to said power supply representative of said parameter; a sensor for detecting connection of said remote selector with said welder, and means for connecting said remote signal with said power supply in response to said sensor detecting said connection.

29. The welder of claim 28, wherein said remote selector is a foot pedal.

30. The welder of claim 28, wherein said means for connecting said remote signal with said power supply includes switching means for disconnecting said local signal from said power supply in response to said sensor detecting said connection.

31. A welding apparatus comprising a local selector connected to said apparatus and a remote selector connectable to said apparatus said local and remote sensors respectively providing local and remote signals having values representative of an electrical parameter associated with a welding operation; a power supply providing electrical power for said welding operation according to one of said local and said remote signals; a sensor detecting connection of said remote selector with said apparatus; and a switching circuit connecting said remote signal with said power supply and disconnecting said local signal from said power supply in response to said sensor detecting said connection.

* * * * *

UNITED STATES PATENT AND TRADEMARK OFFICE
CERTIFICATE OF CORRECTION

PATENT NO. : 5,864,117

DATED : January 26, 1999

INVENTOR(S) : Joel D. Kneisley, et al.

It is certified that error appears in the above-identified patent and that said Letters Patent is hereby corrected as shown below:

Column 8, line 36, change ";" to --,--.

Column 8, line 38, change ";" to --,--.

Column 8, line 52, change "sensors" to --selectors--.

Column 8, line 57, after "sensor" insert --for--.

Signed and Sealed this

Thirty-first Day of August, 1999

Q. TODD DICKINSON

*Attest:*

*Attesting Officer*   *Acting Commissioner of Patents and Trademarks*